UNITED STATES PATENT OFFICE.

WILLIS H. POST, OF BATTLE CREEK, MICHIGAN, ASSIGNOR TO POSTUM CEREAL CO., LIMITED, OF BATTLE CREEK, MICHIGAN, A PARTNERSHIP.

BEVERAGE EXTRACT.

1,064,768.  Specification of Letters Patent.  Patented June 17, 1913.

No Drawing.  Application filed September 19, 1912.  Serial No. 721,280.

*To all whom it may concern:*

Be it known that I, WILLIS H. POST, of Battle Creek, Michigan, have invented a new and useful Improvement in Beverage Extracts, which invention is fully set forth in the following specification.

This invention relates to beverage extracts and more particularly to a water soluble extract derived from dandelion roots and a saccharine body which when dissolved in water produces a beverage possessing a pleasant bitter flavor and empyreumatic aroma suggestion of coffee but not containing its alkaloids.

Dandelion roots are known to contain bitter principles and sugar and sugar-like bodies which have lead to the use of their roots for medicinal purposes and also to their use in ground and roasted condition as additions to coffee and as a coffee substitute to be prepared as coffee by brewing or steeping the roasted roots. The preparation of a palatable beverage from roasted dandelion roots requires more skill than can be expected from the ordinary cook since much depends on the selection of the roots and their roasting to secure a uniform product. I have discovered that these objections may be overcome and a beverage extract prepared that is practically uniform in character, is readily soluble in hot or cold water, and makes a beverage superior in flavor to that heretofore prepared from the roasted dandelion roots.

By way of illustrating one way in which the benefits of my invention may be secured, I preferably proceed in the following manner, though I do not wish to be understood as limiting my product to any particular method of production: Dandelion roots are selected in which the bitter principles are well developed. Roots gathered from spring to autumn are considered preferable for this reason. The roots are cleaned and in more or less dried condition are mixed with about 20% of saccharine material, preferably New Orleans molasses, though other saccharine substances may be used such as sugar, sirups or fruits containing sugar. To facilitate subsequent operations, the roots may be comminuted before or when admixed with the saccharine body. The mass is then subjected to a temperature sufficient to caramelize the sugar and it may be carried to the point of slight carbonizing with advantage. The roasting may be conducted in the open air or air may be more or less excluded. Instead of roasting the dandelion roots and molasses together, the two may be roasted separately and afterward incorporated. I prefer, however, to roast the materials in presence of each other for I believe a better product is secured. Having prepared the roasted product from which it is desired to make the solid extract, the product is treated with water to dissolve out its soluble constitutents. The extraction may be made in cold water or by steeping or boiling with water, but I prefer to use percolation with water at about 50° to 60° C., thereby obtaining usually a clear solution which is ready for the production of the solid extract. Should the solution not be clear, filtration is resorted to to make it so. The clear aqueous solution is next concentrated by evaporation to a solid. This operation is preferably conducted in a vacuum pan or on a rotary drum *in vacuo*, the usual precautions well-known to those skilled in this art being taken to prevent injury of the product. The dried extract is then comminuted or reduced to grains, powder, flakes or other sub-divided form and is ready for packing. The resulting product is a beverage extract which in comminuted form is of extreme solubility in water. A teaspoonful of the extract may be dissolved in a cup of hot water in one minute or less and produces a palatable beverage of pleasing flavor resembling coffee.

What I claim is:—

1. A solid soluble extract for preparing beverages, consisting of extractive matter in soluble form from dandelion roots and a saccharine body roasted to caramelize the sugar content.

2. A solid soluble extract for preparing beverages, consisting of soluble extractive matter in comminuted form derived from roasted dandelion roots and a caramelized saccharine body.

3. A solid soluble extract for preparing beverages, consisting of soluble extractive matter of roasted dandelion roots and caramelized molasses.

4. A solid soluble extract for preparing beverages consisting of soluble extractive matter of dandelion roots and a saccharine body roasted to partial carbonization.

5. A solid soluble extract for preparing beverages, consisting of soluble extractive matter in comminuted form of dandelion roots in molasses roasted to partial carbonization.

In testimony whereof I have signed this specification in the presence of two subscribing witnesses.

WILLIS H. POST.

Witnesses:
VERN D. SUTTON,
G. M. LA PIERRE.